(12) United States Patent
Hamakubo et al.

(10) Patent No.: US 11,919,804 B2
(45) Date of Patent: Mar. 5, 2024

(54) RESIN COMPOSITION, SECONDARY COATING MATERIAL FOR OPTICAL FIBER, OPTICAL FIBER, AND METHOD FOR MANUFACTURING OPTICAL FIBER

(71) Applicant: SUMITOMO ELECTRIC INDUSTRIES, LTD., Osaka (JP)

(72) Inventors: Katsushi Hamakubo, Osaka (JP); Chiaki Tokuda, Osaka (JP); Noriaki Iwaguchi, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 479 days.

(21) Appl. No.: 17/271,472

(22) PCT Filed: Jun. 10, 2020

(86) PCT No.: PCT/JP2020/022886
§ 371 (c)(1),
(2) Date: Feb. 25, 2021

(87) PCT Pub. No.: WO2020/255829
PCT Pub. Date: Dec. 24, 2020

(65) Prior Publication Data
US 2021/0309566 A1    Oct. 7, 2021

(30) Foreign Application Priority Data
Jun. 19, 2019  (JP) .................................. 2019-113478

(51) Int. Cl.
*C03C 25/1065*   (2018.01)
*C03C 25/285*    (2018.01)
(Continued)

(52) U.S. Cl.
CPC ........ *C03C 25/1065* (2013.01); *C03C 25/285* (2013.01); *C03C 25/32* (2013.01);
(Continued)

(58) Field of Classification Search
CPC ............. G02B 6/02395; G02B 6/4401; C03C 25/285; C03C 25/1065; C03C 25/32; C09D 151/08; C08K 3/36
See application file for complete search history.

(56) References Cited

U.S. PATENT DOCUMENTS 9,884,969 B2    2/2018   Kim et al.
10,266,630 B2 *  4/2019   Hayashi .................... C08F 2/48
(Continued)

FOREIGN PATENT DOCUMENTS

CN   105372752 A   3/2016
CN   107073816 A   8/2017
(Continued)

*Primary Examiner* — Omar R Rojas
(74) *Attorney, Agent, or Firm* — Faegre Drinker Biddle & Reath LLP

(57) ABSTRACT

The resin composition according to an aspect of the present disclosure is a resin composition containing a photopolymerizable compound comprising urethane (meth)acrylate and a polyrotaxane, and a photopolymerization initiator, and the content of the polyrotaxane is 0.05% by mass or more and 11% by mass or less based on the total amount of the photopolymerizable compound.

12 Claims, 1 Drawing Sheet

(51) Int. Cl.
  *C03C 25/32* (2018.01)
  *C09D 151/08* (2006.01)
  *G02B 6/02* (2006.01)
  *C08K 3/36* (2006.01)

(52) U.S. Cl.
  CPC ....... *C09D 151/08* (2013.01); *G02B 6/02395* (2013.01); *C08K 3/36* (2013.01)

(56) References Cited

U.S. PATENT DOCUMENTS

| | | |
|---|---|---|
| 2012/0163759 A1 | 6/2012 | Hinoshita et al. |
| 2016/0047977 A1 | 2/2016 | Sohma et al. |
| 2016/0056421 A1 | 2/2016 | Kim et al. |
| 2017/0333167 A1* | 11/2017 | Hagiwara ............ A61C 13/087 |

FOREIGN PATENT DOCUMENTS

| | | |
|---|---|---|
| JP | 2012-136401 A | 7/2012 |
| JP | 2014-118319 A | 6/2014 |
| JP | 2014-219550 A | 11/2014 |
| JP | 2015-199626 A | 11/2015 |
| JP | 2016-532254 A | 10/2016 |
| WO | WO-2010/064535 A1 | 6/2010 |
| WO | WO-2016/071811 A1 | 5/2016 |
| WO | WO-2018/043512 A1 | 3/2018 |
| WO | WO-2019/026356 A1 | 2/2019 |

\* cited by examiner

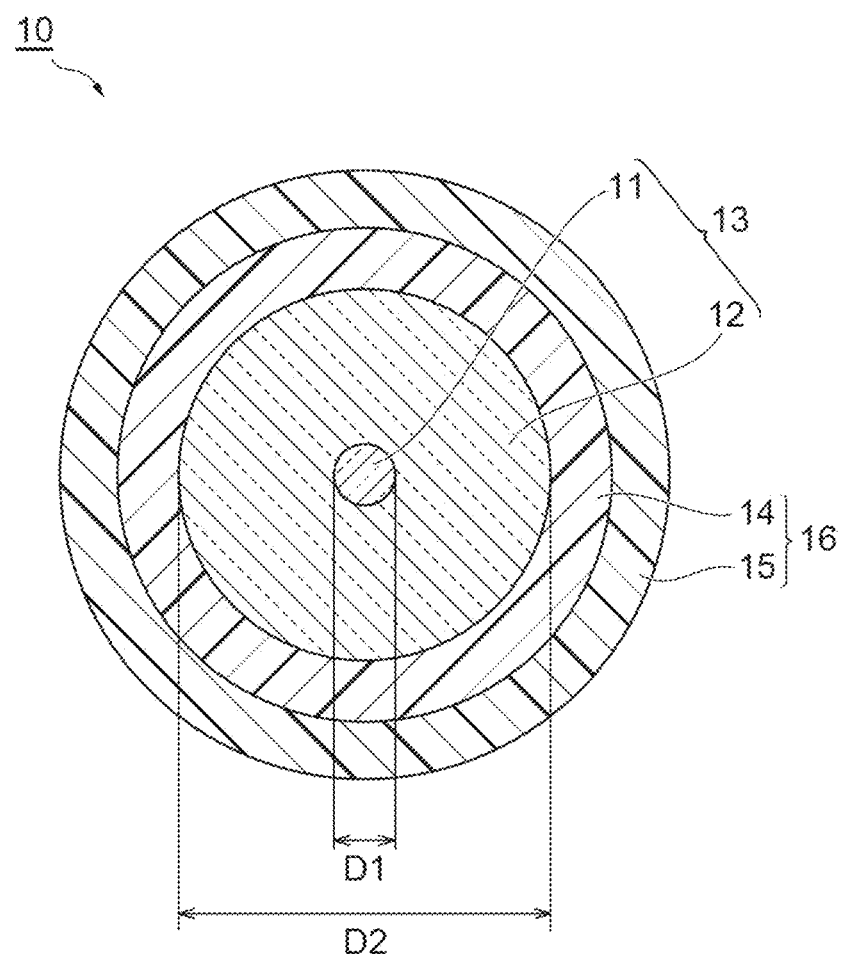

US 11,919,804 B2

RESIN COMPOSITION, SECONDARY COATING MATERIAL FOR OPTICAL FIBER, OPTICAL FIBER, AND METHOD FOR MANUFACTURING OPTICAL FIBER

TECHNICAL FIELD

The present disclosure relates to a resin composition, a secondary coating material for an optical fiber, an optical fiber, and a method for manufacturing the optical fiber.

This application claims priority based on Japanese Patent Application No. 2019-113478 filed on Jun. 19, 2019, and incorporates all the contents described in the Japanese application.

BACKGROUND ART

An optical fiber has generally a coating resin layer for protecting a glass fiber that is an optical transmission medium. In order to reduce an increase in transmission loss induced by micro-bend generated when lateral pressure is applied to the optical fiber, the optical fiber has been required to have excellent lateral pressure characteristics.

The coating resin layer can be formed by using an ultraviolet curable resin composition containing a photopolymerizable compound, a photopolymerization initiator and the like. For example, in Patent Literature 1, it is investigated to improve the lateral pressure characteristics of the optical fiber by forming a resin layer using an ultraviolet curable resin composition containing a filler made of synthetic silica as a raw material.

CITATION LIST

Patent Literature

[Patent Literature 1] JP 2014-219550 A

SUMMARY OF INVENTION

A resin composition according to an aspect of the present disclosure contains a photopolymerizable compound comprising urethane (meth)acrylate and a polyrotaxane, and a photopolymerization initiator, and the content of the polyrotaxane is 0.05% by mass or more and 11% by mass or less based on the total amount of the photopolymerizable compound.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

A coating resin layer generally comprises a primary resin layer and a secondary resin layer. The resin composition forming the secondary resin layer is required to improve the lateral pressure characteristics of the optical fiber by increasing the Young's modulus. However, increasing the Young's modulus of the secondary resin layer causes reduction in toughness of the resin layer, and therefore cracks occur on the resin layer during screening of the optical fiber, which causes an increase in loss in the reliability test. In addition, the optical fiber is often used by being housed in a cable in a condition of being immersed in a jelly including oil. When the optical fiber is immersed in the jelly, the coating resin layer absorbs oil, and the adhesion of the coating resin layer to the glass fiber is reduced, and thus the transmission characteristics may be deteriorated. Therefore, the coating resin layer is required to have excellent oil resistance.

An object of the present disclosure is to provide a resin composition capable of forming a resin layer that has excellent oil resistance and can improve the lateral pressure characteristics of the optical fiber, and an optical fiber having excellent oil resistance and lateral pressure characteristics.

Effects of the Present Disclosure

The present disclosure can provide a resin composition capable of forming a resin layer that has excellent oil resistance and can improve the lateral pressure characteristics of the optical fiber, and an optical fiber having excellent oil resistance and lateral pressure characteristics.

Description of Embodiments of the Present Disclosure

First, the contents of the embodiment of the present disclosure will be described by listing them. A resin composition according to an aspect of the present disclosure contains a photopolymerizable compound comprising urethane (meth)acrylate and a polyrotaxane, and a photopolymerization initiator, and the content of the polyrotaxane is 0.05% by mass or more and 11% by mass or less based on the total amount of the photopolymerizable compound.

The polyrotaxane is a compound composed of a linear polymer and a cyclic molecule. The linear polymer is included in the opening of the cyclic molecule in a condition of being skewered, and has blocking groups at both ends so that the cyclic molecule is not detached. The cyclic molecule may have an ultraviolet curable group. Introducing such a structure based on the polyrotaxane into the resin layer can relax the stress applied to the resin layer, thereby allowing formation of a resin layer having an excellent balance between strength and toughness. An optical fiber having excellent oil resistance and lateral pressure characteristics can be prepared by using the resin composition according to the present embodiment as an ultraviolet curable resin composition for coating the optical fiber.

Due to easy improvement in the strength of the resin layer, the above polyrotaxane may comprise a cyclic molecule having at least one ultraviolet curable group selected from the group consisting of an acryloyl group, a methacryloyl group, and a vinyl group. Due to easy improvement in the toughness of the resin layer, the polyrotaxane may comprise a linear polymer having an adamantyl group.

The resin composition according to the present embodiment may further contain an inorganic oxide, from the viewpoint of producing an optical fiber having further excellent oil resistance and lateral pressure characteristics.

The secondary coating material for the optical fiber according to an aspect of the present disclosure comprises the above resin composition. Using the resin composition according to the present embodiment for the secondary resin layer, the resin layer having excellent oil resistance can be formed.

The optical fiber according to an aspect of the present disclosure comprises a glass fiber comprising a core and a cladding, a primary resin layer being in contact with a glass fiber and coating the glass fiber, and a secondary resin layer coating the primary resin layer, wherein the secondary resin layer comprises a cured product of the above resin composition. The resin composition according to the present embodiment is applied to the secondary resin layer, allowing improvement in the oil resistance and the lateral pressure characteristics of the optical fiber.

A method for manufacturing the optical fiber according to an aspect of the present disclosure comprises an application step of applying the above resin composition onto the outer periphery of a glass fiber composed of a core and a cladding and a curing step of curing the resin composition by irradiation with ultraviolet rays after the application step. This can form a resin layer having an excellent balance between strength and toughness, allowing production of an optical fiber having excellent oil resistance and lateral pressure characteristics.

DETAIL OF EMBODIMENT OF THE PRESENT DISCLOSURE

Specific examples of a resin composition and an optical fiber according to the present embodiment of the present disclosure will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Resin Composition>

The resin composition according to the present embodiment contains a photopolymerizable compound comprising urethane (meth)acrylate and a polyrotaxane, and a photopolymerization initiator.

(Photopolymerizable Compound)

The polyrotaxane according to the present embodiment is a compound composed of linear polymers and cyclic molecules. The polyrotaxane may be ultraviolet curable. When the polyrotaxane has an ultraviolet curable group, the polyrotaxane can form a covalent bond with a photopolymerizable compound such as urethane (meth)acrylate.

The linear polymer has a linear main chain and a blocking group bonded to both ends of the main chain. Examples of the polymer constituting the main chain of the linear polymer include polyvinyl alcohol, polyvinylpyrrolidone, polyethylene glycol, polypropylene glycol, polyisoprene, polyisobutylene, polybutadiene, polytetrahydrofuran, polydimethylsiloxane, polyacrylamide, polyolefin, and polyester. Examples of the blocking group include a dinitrophenyl group, an adamantyl group, a trityl group, a fluorescein group, and a pyrene group. From the viewpoint of imparting toughness to the resin layer, the linear polymer preferably has a main chain based on polyethylene glycol and an adamantyl group as a blocking group.

The weight average molecular weight (Mw) of the linear polymer is preferably 3000 or more and 80000 or less, more preferably 5000 or more and 60000 or less, and further preferably 10000 or more and 40000 or less.

Examples of the cyclic molecule include a cyclodextrin compound and a crown ether compound. The cyclic molecule may have an ultraviolet curable group, and examples of the ultraviolet curable group include an acryloyl group, a metaacryloyl group, and a vinyl group.

The Mw of the polyrotaxane according to the present embodiment is preferably 100000 or more and 1500000 or less, more preferably 140000 or more and 1300000 or less, and further preferably 160000 or more and 1200000 or less. The Mw can be measured by the GPC method.

Commercially available products can be used as the polyrotaxane, such as SeRM Super Polymers "SM3403P", "SM2403P", "SM1303P", "SA3403P", "SA2403P", "SA1303", "SA2405P-10", "SA2405P-20", "SA1305P-10", and "SA1305P-20", manufactured by Advanced Softmaterials, Inc.

Due to improvement in the toughness of the resin layer, the content of the polyrotaxane is 0.05% by mass or more, preferably 0.08% by mass or more, and more preferably 0.1% by mass or more based on the total amount of the photopolymerizable compound. Due to improvement in the strength of the resin layer, the content of the polyrotaxane is 11% by mass or less, preferably 10.5% by mass or less, and more preferably 10% by mass or less based on the total amount of the photopolymerizable compound.

As the urethane (meth)acrylate, an oligomer obtained by reacting a polyol compound, a polyisocyanate compound, and a hydroxyl group-containing (meth)acrylate compound can be used. (Meth)acrylate means an acrylate or a methacrylate corresponding to it. The same applies to (meth) acrylic acid.

Examples of the polyol compound include polytetramethylene glycol, polypropylene glycol, and bisphenol A-ethylene oxide addition diol. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

As a catalyst for synthesizing a urethane (meth)acrylate, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of easy availability or catalyst performance, it is preferable that dibutyltin dilaurate or dibutyltin diacetate be used as catalyst.

When the urethane (meth)acrylate is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

From the viewpoint of increasing the Young's modulus of the resin layer, the photopolymerizable compound according to the present embodiment may further comprise an epoxy (meth)acrylate. As an epoxy (meth)acrylate, an oligomer obtained by reacting a compound having a (meth)acryloyl group with an epoxy resin having two or more glycidyl groups can be used.

The photopolymerizable compound according to the present embodiment may further comprise a photopolymerizable compound (hereinafter, referred to as "monomer") other than the polyrotaxane, urethane (meth)acrylate, and epoxy (meth)acrylate. As the monomer, a monofunctional monomer having one polymerizable group or a multifunctional monomer having two or more polymerizable groups can be used. A monomer may be used by mixing two or more monomers.

Examples of the monofunctional monomer include (meth) acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl (meth)acrylate, phenoxydiethylene glycol acrylate, phenoxypolyethylene glycol (meth)acrylate, 4-tert-butylcyclohexanol (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxy polyethylene glycol (meth) acrylate, and isobornyl (meth)acrylate; carboxyl group-containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing (meth)acrylates such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth) acrylamide, N-methyl (meth)acrylamide, N-isopropyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecanediol di(meth)acrylate, 1,20-eicosanediol di(meth) acrylate, isopentyl diol di(meth)acrylate, 3-ethyl-1, 8-octanediol di(meth)acrylate, EO adduct of bisphenol A di(meth)acrylate, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth) acrylate, ditrimethylol propane tetra(meth)acrylate, dipentaerythritol tetra(meth)acrylate, dipentaerythritol penta (meth)acrylate, dipentaerythritol hexa(meth)acrylate, and caprolactone-modified tris[(meth)acryloyloxyethyl] isocyanurate.

(Photopolymerization Initiator)

The photopolymerization initiator can be appropriately selected from known radical photopolymerization initiators and used. Examples of the photopolymerization initiator include 1-hydroxycyclohexyl phenyl ketone (Omnirad 184 manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

(Inorganic Oxide Particles)

The resin composition according to the present embodiment may further contain hydrophobic inorganic oxide particles. The inorganic oxide particles have a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersibility in the resin composition. The hydrophobic group may be a reactive group such as a (meth)acryloyl group or a vinyl group, or may be a non-reactive group such as an aliphatic hydrocarbon group (for example, an alkyl group) or an aromatic hydrocarbon group (for example, a phenyl group). In the case of the inorganic oxide particles having a reactive group, the resin layer having high Young's modulus is easy to form.

The inorganic oxide particles according to the present embodiment are dispersed in a dispersion medium. Using the inorganic oxide particles dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, and polytetramethylene glycol di(meth)acrylate. Compounds exemplified by monomers described above may be used as the (meth)acryloyl compound.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium. When the dispersion medium including the inorganic oxide particles is observed with an optical microscope (about 100 times magnification) and particles are not observed, the inorganic oxide particles are regarded to be dispersed as the primary particles.

The inorganic oxide particles dispersed in the dispersion medium remain to be dispersed in the resin layer after curing of the resin composition. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

Due to excellent dispersion properties in the resin composition and easy formation of tough resin layer, it is preferable that the above inorganic oxide particles are particles including at least one selected from the group consisting of silicon dioxide (silica), zirconium dioxide (zirconia), aluminum oxide (alumina), magnesium oxide (magnesia), titanium oxide (titania), tin oxide, and zinc oxide. From the viewpoint of excellent inexpensiveness, easy surface treatment, permeability to ultraviolet ray, easy provision of a resin layer with appropriate hardness, and the like, it is more preferable that the hydrophobic silica particles be used as the inorganic oxide particles according to the present embodiment.

From the viewpoint of imparting appropriate toughness to the secondary resin layer, the average primary particle size of the inorganic oxide particles may be 200 nm or less, 100 nm or less, 50 nm or less, or 30 nm or less. From the viewpoint of increasing the Young's modulus of the secondary resin layer, the average primary particle size of the inorganic oxide particles may be 1 nm or more, 5 nm or more, or 10 nm or more. The average primary particle diameter can be measured with image analysis of electron microscope pictures, a light scattering method or a BET method, for example. The dispersion medium in which the primary particle of the inorganic oxide is dispersed appears to be visually transparent when the diameter of the primary particle is small. When the diameter of the primary particle is relatively large (40 nm or more), the dispersion medium in which the primary particle is dispersed appears to be clouded, but the precipitate is not observed.

The content of the inorganic oxide particles may be 1% by mass or more and 60% by mass or less, 5% by mass or more and 50% by mass or less, or 10% by mass or more and 40% by mass or less based on the total amount of the photopolymerizable compound and the inorganic oxide particles. The content of the inorganic oxide particles of 1% by mass or more allows for easy increase in the Young's modulus of the resin layer. The content of the inorganic oxide particles of 60% by mass or less allows for easy impairment of the toughness to the resin composition.

The resin composition may further contain a silane coupling agent, a leveling agent, an antifoaming agent, an antioxidant, or a sensitizer.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl] tetrasulfide, bis-[3-(triethoxysilyl)propyl] disulfide, γ-trimethoxysilylpropyldimethylthiocarbamyl tetrasulfide, and γ-trimethoxysilylpropyl benzothiazyl tetrasulfide.

The resin composition according to the present embodiment is preferably used as the secondary coating material for the optical fiber. Using the resin composition according to the present embodiment for the secondary resin layer, the coating resin layer having excellent lateral pressure characteristics can be formed.

<Optical Fiber>

FIG. 1 is a schematic cross-section diagram showing an example of the optical fiber according to the present embodiment. The optical fiber 10 comprises the glass fiber 13 comprising the core 11 and the cladding 12, and the coating resin layer 16 comprising the primary resin layer 14 provided on the outer periphery of the glass fiber 13 and the secondary resin layer 15.

The cladding 12 surrounds the core 11. The core 11 and the cladding 12 mainly comprise glass such as silica glass, germanium-added silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, for example, the thickness of the primary resin layer 14 may be 35 μm and the thickness of the secondary resin layer 15 may be 25 μm. The outside diameter of the optical fiber 10 may be about 245 μm to 265 μm.

When the outer diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, for example, the thickness of the primary resin layer 14 may be 25 μm and the thickness of the secondary resin layer 15 may be 10 μm. The outside diameter of the optical fiber 10 may be about 144 μm to 174 μm.

The resin composition according to the present embodiment can be applied to the secondary resin layer. The secondary resin layer can be formed by curing the above resin composition. Accordingly, the lateral pressure characteristics of the optical fiber can be improved.

A method for manufacturing the optical fiber according to the present embodiment comprises an application step of applying the above resin composition onto the outer periphery of a glass fiber composed of a core and a cladding; and a curing step of curing the resin composition by irradiation with ultraviolet rays after the application step.

The Young's modulus of the secondary resin layer is preferably 1150 MPa or more and 2700 MPa or less at 23° C., more preferably 1200 MPa or more and 2000 MPa or less, and further preferably 1300 MPa or more and 1800 MPa or less. The Young's modulus of the secondary resin layer of 1150 MPa or more is easy to improve the lateral pressure characteristics, and the Young's modulus of 2700 MPa or less can provide proper toughness to the secondary resin layer so that a crack or the like in the secondary resin layer is hard to occur.

The primary resin layer 14 can be formed by curing a resin composition comprising a urethane (meth)acrylate, a monomer, a photopolymerization initiator and a silane coupling agent. Prior art techniques can be used for a resin composition for the primary resin layer. A urethane (meth) acrylate, a monomer, a photopolymerization initiator and a silane coupling agent may be appropriately selected from compounds exemplified in the above base resin. The resin composition constituting the primary resin layer has composition different from the base resin forming the secondary resin layer.

A plurality of optical fibers may be arranged in parallel and integrated with a ribbon resin to form an optical fiber ribbon. The resin composition according to the present disclosure can also be used as a ribbon resin. This can improve the oil resistance and the lateral pressure characteristics of the optical fiber ribbon as in the case of the optical fiber.

EXAMPLES

Hereinafter, the results of evaluation test using Examples and Comparative Examples according to the present disclosure will be shown, and the present disclosure is described in more detail. The present invention is not limited to these examples.

[Resin Composition for a Secondary Resin Layer]
(Photopolymerizable Compound)

The trade names "SA1303" (linear polymer Mw: 11000), "SA2403P" (linear polymer Mw: 20000), and "SA3403P" (linear polymer Mw: 35000) of Advanced Softmaterials, Inc. were prepared as the polyrotaxane having an acryloyl group.

A urethane acrylate (UA) obtained by reacting polypropylene glycol having a molecular weight of 1000, 2,4-tolylene diisocyanate, and hydroxyethyl acrylate, and an epoxy acrylate (EA) were prepared.

2-phenoxyethyl acrylate (POA, trade name "Light Acrylate PO-A" of Kyoeisha Chemical Co., Ltd.), isobornyl acrylate (trade name "IBXA" of Osaka Organic Chemical Industry Co. Ltd.), and tripropylene glycol diacrylate (TPGDA, trade name "Viscoat #310HP" of Osaka Organic Chemical Industry Co., Ltd.) were prepared as the monomers.

(Photopolymerization Initiator)
As the photopolymerization initiator, 1-hydroxycyclohexyl phenyl ketone and 2,4,6-trimethylbenzoyldiphenylphosphine oxide were prepared.

(Inorganic Oxide Particles)
A silica sol having a methacryloyl group and hydrophobic silica particles having an average primary particle size of 10 to 15 nm dispersed in MEK was prepared as the inorganic oxide particles.

(Resin Composition)
The resin compositions of Examples 1 to 10 and Comparative Examples 1 to 3 was produced by mixing a polyrotaxane, urethane acrylate, epoxy acrylate, a monomer, and a photopolymerization initiator in the blending amount shown in Table 1 or Table 2. In addition, the resin composition of Example 11 was produced by further mixing a silica sol so as to have the content of silica particles shown in Table 2 and removing most of MEK as a dispersion medium under reduced pressure.

In Table 1 and Table 2, the value of the polyrotaxane is the content (% by mass) based on the total amount of the photopolymerizable compound, the values of urethane acrylate, epoxy acrylate, and a monomer are the contents (% by mass) based on the total amount of urethane acrylate, epoxy acrylate, and a monomer, and the value of the silica particles is the content (% by mass) based on the total amount of the photopolymerizable compound and the silica particles.

(Young's Modulus)
The resin composition was applied onto a polyethylene terephthalate (PET) film by using a spin coater, and then cured by using an electrodeless UV lamp system ("VPS 600 (D valve)" manufactured by Heraeus) at a condition of 1000±100 mJ/cm$^2$ to form a resin layer having a thickness of 200±20 μm on the PET film. The resin layer was peeled off from the PET film to obtain a resin film. A resin film was punched into a dumbbell shape of JIS K 7127 type 5 and was pulled under a condition of 23±2° C. and 50±10% RH, a tensile speed of 1 mm/min and a distance between marked lines of 25 mm using a tensile tester, and a stress-strain curve was obtained. Young's modulus was determined by 2.5% secant line.

[Production of Optical Fiber]
(Resin Composition for Primary Resin Layer)
Urethane acrylate obtained by reacting polypropylene glycol having a molecular weight of 4000, isophorone diisocyanate, hydroxyethyl acrylate, and methanol was prepared as the oligomer. The resin composition for the primary resin layer was produced by mixing 75 parts by mass of urethane acrylate, 12 parts by mass of nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane.

(Optical Fiber)
The resin composition for the primary resin layer and the resin composition of Examples or Comparative Examples for the secondary resin layer were applied onto the outer periphery of a 125 μm diameter glass fiber composed of a core and a cladding, and then the resin composition was cured by irradiation with ultraviolet rays and a primary resin layer having a thickness of 35 μm and a secondary resin layer having a thickness of 25 μm around the outer periphery thereof were formed to produce an optical fiber. A linear speed was 1500 m/min (Lateral Pressure Characteristics)
The transmission loss of light having a wavelength of 1550 nm when the optical fiber was wound into a single layer on a bobbin having a diameter of 280 mm whose surface was covered with sandpaper was measured by an OTDR (Optical Time Domain Reflectometer) method. In addition, the transmission loss of light having a wavelength of 1550 nm when the optical fiber was wound into a single layer on a bobbin having a diameter of 280 mm without sandpaper was measured by the OTDR method. Difference in the measured transmission loss was obtained and the lateral pressure characteristics was judged to be "OK" when the transmission loss difference was 0.6 dB/km or less, and the lateral pressure characteristics was judged to be "NG" when the transmission loss difference was over 0.6 dB/km.

(Oil Resistance)
The optical fiber was immersed in a jelly heated to 85° C. for 60 days so that the entire coating resin layer was completely immersed. A jelly was obtained by adding a thickener to a mineral oil having a molecular weight of about 300 to 600. The transmission characteristics of the signal having a wavelength of 1550 nm were measured under the respective temperature conditions of 23° C. and −40° C., and the transmission losses at 23° C. and −40° C. were evaluated. The case where the difference obtained by subtracting the transmission loss at 23° C. from the transmission loss at −40° C. (transmission loss difference) was 0.05 dB/km or less (transmission loss at −40° C. was smaller) was evaluated as "A", and the case of more than 0.05 dB/km was evaluated as "B".

TABLE 1

|  | Example 1 | Example 2 | Example 3 | Example 4 | Example 5 | Example 6 | Example 7 | Example 8 |
|---|---|---|---|---|---|---|---|---|
| SA2403P | 0.1 | 0.3 | 0.5 | 1.0 | 3.0 | 5.0 | 8.0 | 10.0 |
| UA | 25 | 25 | 25 | 25 | 25 | 25 | 25 | 25 |
| EA | 43 | 43 | 43 | 43 | 43 | 43 | 43 | 43 |
| POA | 10 | — | — | — | — | — | — | — |
| IBXA | 22 | 32 | 32 | 32 | 32 | 32 | 32 | 32 |
| Omnirad 184 | 0.5 | 0.5 | 0.5 | 0.5 | 0.5 | 0.5 | 0.5 | 0.5 |
| Omnirad TPO | 0.5 | 0.5 | 0.5 | 0.5 | 0.5 | 0.5 | 0.5 | 0.5 |
| Young's modulus (MPa) | 1700 | 1700 | 1700 | 1700 | 1700 | 1700 | 1600 | 1600 |
| Lateral pressure characteristics | OK | OK | OK | OK | OK | OK | OK | OK |
| Oil resistance | A | A | A | A | A | A | A | A |

TABLE 2

|  | Example 9 | Example 10 | Example 11 | Comparative Example 1 | Comparative Example 2 | Comparative Example 3 |
|---|---|---|---|---|---|---|
| SA1303P | 1.0 | — | — | — | — | — |
| SA2403P | — | — | 1.0 | — | 0.01 | 12.0 |
| SA3403P | — | 1.0 | — | — | — | — |
| UA | 25 | 25 | 20 | 25 | 25 | 25 |
| EA | 43 | 43 | 30 | 43 | 43 | 43 |
| IBXA | 32 | 32 | 10 | 32 | 32 | 32 |
| TPGDA | — | — | 40 | — | — | — |
| Silica | — | — | 20 | — | — | — |
| Omnirad 184 | 0.5 | 0.5 | 0.5 | 0.5 | 0.5 | 0.5 |
| Omnirad TPO | 0.5 | 0.5 | 0.5 | 0.5 | 0.5 | 0.5 |
| Young's modulus (MPa) | 1700 | 1700 | 1700 | 1700 | 1700 | 1100 |
| Lateral pressure characteristics | OK | OK | OK | OK | OK | NG |
| Oil resistance | A | A | A | B | B | A |

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. An optical fiber comprising:
   a glass fiber comprising a core and a cladding;
   a primary resin layer being in contact with the glass fiber and coating the glass fiber; and
   a secondary resin layer coating the primary resin layer,
   wherein the secondary resin layer comprises a cured product of a resin composition comprising a photopolymerizable compound comprising urethane (meth)acrylate and a polyrotaxane, and a photopolymerization initiator, wherein a content of the polyrotaxane is 0.05% by mass or more and 11% by mass or less based on a total amount of the photopolymerizable compound.

2. The optical fiber according to claim 1, wherein the polyrotaxane comprises a cyclic molecule having at least one ultraviolet curable group selected from the group consisting of an acryloyl group, a methacryloyl group, and a vinyl group.

3. The optical fiber according to claim 1, wherein the polyrotaxane comprises a linear polymer having an adamantyl group.

4. The optical fiber according to claim 1, further containing an inorganic oxide.

5. The optical fiber according to claim 2, wherein the polyrotaxane comprises a linear polymer having an adamantyl group.

6. The optical fiber according to claim 2, further containing an inorganic oxide.

7. The optical fiber according to claim 3, further containing an inorganic oxide.

8. The optical fiber according to claim 5, further containing an inorganic oxide.

9. A method for manufacturing an optical fiber, comprising:
   an application step of applying a resin composition comprising a photopolymerizable compound comprising urethane (meth)acrylate and a polyrotaxane, and a photopolymerization initiator, wherein a content of the polyrotaxane is 0.05% by mass or more and 11% by mass or less based on a total amount of the photopolymerizable compound onto an outer periphery of a glass fiber comprising a core and a cladding; and
   a curing step of curing the resin composition by irradiation with ultraviolet rays after the application step.

10. The method for manufacturing an optical fiber according to claim 9, wherein the polyrotaxane comprises a cyclic molecule having at least one ultraviolet curable group selected from the group consisting of an acryloyl group, a methacryloyl group, and a vinyl group.

11. The method for manufacturing an optical fiber according to claim 9, wherein the polyrotaxane comprises a linear polymer having an adamantyl group.

12. The method for manufacturing an optical fiber according to claim 9, wherein the resin composition further contains an inorganic oxide.

* * * * *